3 Sheets—Sheet 1.

I. A. SALMON.

APPARATUS FOR HEATING CARS.

No. 10,190. Reissued Aug. 29, 1882.

Witnesses;
Walter Fowler
H. B. Applewhaite

Inventor;
Ira A. Salmon
by
F. A. H. Evans & Co
Attys

I. A. SALMON.

APPARATUS FOR HEATING CARS.

No. 10,190. Reissued Aug. 29, 1882.

Witnesses;
S. Calvin Fowler,
H. B. Applewhaite,

Inventor;
Ira A. Salmon
by A. H. Evans & Co
Attys

3 Sheets—Sheet 3.

I. A. SALMON.

APPARATUS FOR HEATING CARS.

No. 10,190 Reissued Aug. 29, 1882.

Witnesses;

S. Walter Fowler,

H. B. Applewhaite.

Inventor;

Ira A. Salmon by A. H. Evans & Co

Attys.

UNITED STATES PATENT OFFICE.

IRA A. SALMON, OF BOSTON, MASSACHUSETTS.

APPARATUS FOR HEATING CARS.

SPECIFICATION forming part of Reissued Letters Patent No. 10,190, dated August 29, 1882.

Original No. 227,997, dated May 25, 1880. Application for reissue filed July 17, 1882.

*To all whom it may concern:*

Be it known that I, IRA A. SALMON, of Boston, in the county of Suffolk and State of Massachusetts, have invented certain new and useful Improvements in Apparatus for Heating Cars, of which the following is a specification.

My invention relates especially to heaters for horse-railway cars, although a similar apparatus may be used with great advantage upon a steam-railway car; and it consists in a novel construction and combination of parts, which will first be fully described, and then specifically pointed out and determined in the claims.

My object is to provide upon the flooring of an ordinary street-railway car a section or space upon which the feet of the passengers occupying the seats may rest, and from which a suitable degree of heat may be imparted to keep the lower extremities comfortably warm. The introduction of even the smallest size of coal-stove causes a great sacrifice of seat-space, and renders the immediate neighborhood of the stove extremely uncomfortable by reason of the high degree of heat necessary in order to retain an equable degree of warmth, and on this account alone the use of stoves is highly objectionable.

I accomplish my purpose without sacrificing a single inch of the seating capacity of the car. I base my invention upon the well-known fact that when the person is exposed to low temperatures the preservation of suitable warmth in the extremities of the body will not only prevent any suffering from the cold, but will insure comfort and obviate all danger of taking cold. As the venous and arterial circulation approaches closely to the surface of the body at the extremities, it is almost invariably at these points that sudden lowering of temperature and consequent chilling of the whole body takes place. Now, if the lower extremities are kept warm by an artificial heat and the upper extremities are protected by ordinary clothing, the result will be that the entire body will enjoy the same comfortable temperature that is produced by a heater which raises the general temperature of the interior of the cars.

Figure 3:
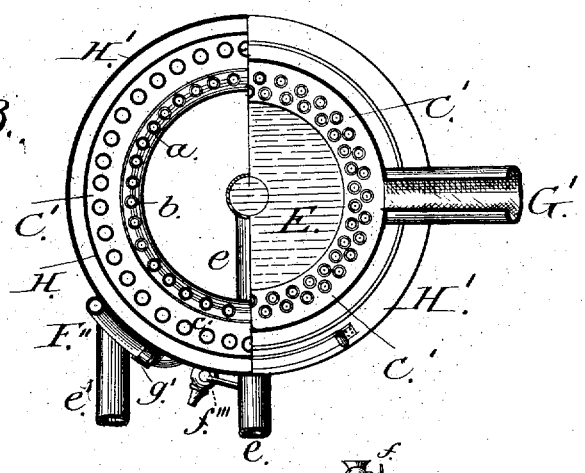
Figure 1:
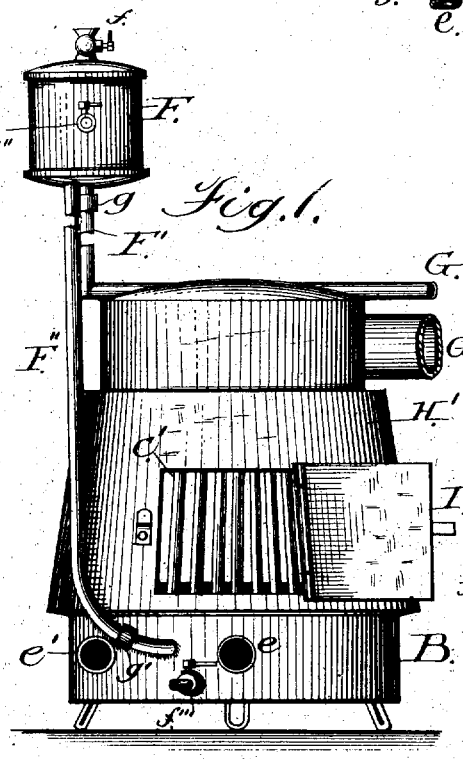
Figure 2:
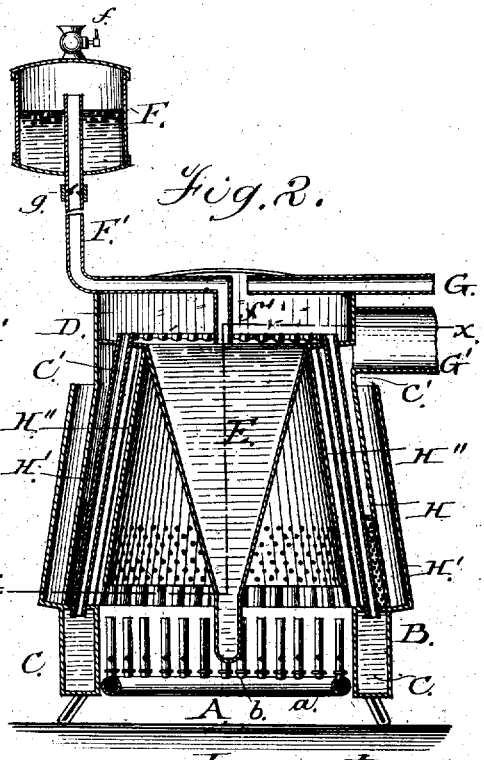
Figure 5:
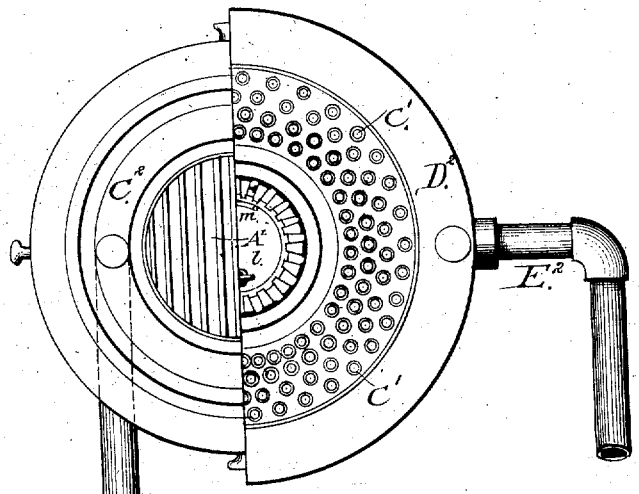
Figure 4:
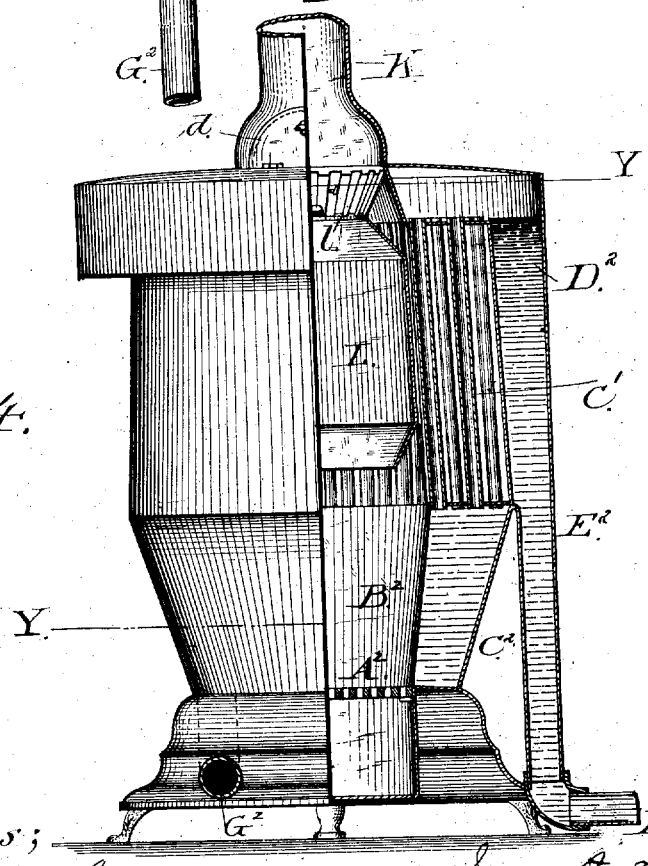
Figure 6:
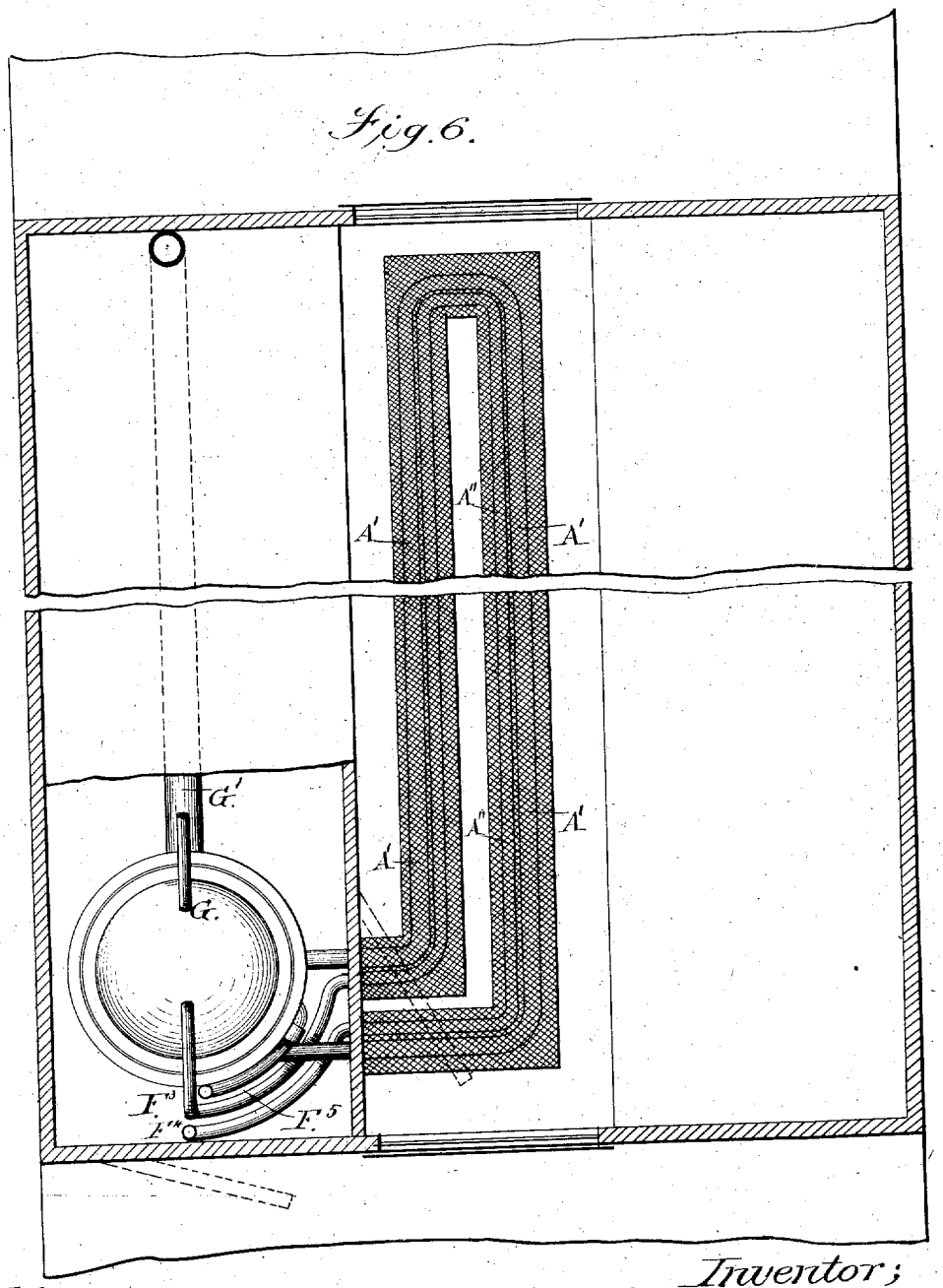

In the drawings forming part of this specification, Figure 1 is a perspective view. Fig. 2 is a vertical section of Fig. 1. Fig. 3 is a cross-section of Fig. 2, taken upon the line X X in Fig. 2. Fig. 4 is a view partly in elevation and partly in section, taken as to the sectional portion upon a central vertical plane, said figure showing certain modifications in construction. Fig. 5 is a cross-section of Fig. 4, the section being taken upon the line Y Y of said Fig. 4; and Fig. 6 is a plan view, showing the floor of an ordinary street-car, with the arrangement of seats, the center of the car-body being broken out in order to show both ends, while the seats are shown somewhat broader in proportion to the width of the aisle than is usual. This change in proportion, however, is simply for the purposes of illustration, since in practice my invention is perfectly adapted to the ordinary street-railway cars now in use without change.

A in the drawings represents the apparatus I employ to obtain combustion when using the hydrocarbon oils or gas as a heating agent. This apparatus consists of a coil, *a*, of gas-tubing passing around the base of the fire-chamber B, and provided at short intervals with ordinary Bunsen burners, *b*, the tubes being connected with a suitable gas-reservoir. This combustion-chamber B is surrounded by an annular water-chamber, C, which is connected by means of a series of short independent tubes, C′, with an upper chamber, D, said tubes being arranged in alternating series, as shown in Fig. 5, whereby I am able to introduce a much larger number than would be possible under any other arrangement. In the center of the combustion-chamber is placed a water-chamber, E, having the shape of an inverted cone, which extends downward until its lower and contracted end is slightly below the plane of combustion in the Bunsen burners. At this point the chamber E terminates in a pipe, *e*, which passes outward through the chamber B.

F is a condensing-drum, having a filling-valve, *f*, and a pipe, F′, which, as seen in Fig. 2, enters the chamber D, the short arm, *f*′, of the said pipe opening into the chamber E at a point a little below the level of the upper ends of the tubes C′ C′ C′.

G′ is a flue for the smoke and products of combustion to escape to the outer air, said flue being either led upward to the roof or caused to discharge beneath the body of the car.

G is a pipe to conduct steam from the top of the heater, if desired, but has no material connection with the invention.

H is a jacket immediately surrounding the tubes C′, and perforated throughout a portion of its surface, as shown in Fig. 2, in order to permit free access of air from the exterior, and thereby support combustion above the combustion-chamber B, about the series of water-tubes C′ C′. Outside this perforated jacket H is a second imperforate jacket, H′, open at top or bottom, or both, to permit access of draft-currents to the jacket H, the object of which is to prevent undue loss of heat by radiation. A third jacket, H″, having its lower portion perforated like H, is placed within the combustion-chamber. This jacket extends down nearly to the foot of the tubes C′, and its purpose is to direct the draft from the interior of the heater in such a manner as to direct the flames mainly upon and around the tubes C′. It will be seen that in Fig. 2 these tubes are arranged between the outer and inner jackets, H and H″, both perforated to admit the air, the object being to cause the draft-currents from outside and inside to rise to the flue between the jackets, thus causing the flames to surround the tubes C′ on all sides.

*f*″ and *f*‴ are petcocks, the former being placed in the condensing-drum F, and the latter in the water-chamber C.

*e* is the eduction-pipe, and *e*′ is the induction-pipe, the former passing the lower end of the conical water-chamber E. The induction-pipe *e*′ opens directly into the water-chamber C.

F″ is a pipe connecting the condenser F with the lower water-chamber, C.

I will now set forth the operation of this form of apparatus, before proceeding to describe the modifications shown in the remaining figures of the drawings.

The filling or tunnel cock *f* in the condensing-drum F being opened, the water-chamber C is filled until the water rises in the tubes C′ and overflows into the chamber E, filling the latter also. The proper quantity to be introduced is indicated by the discharge of surplusage through the petcock *f*‴, which should be kept open for that purpose until the heater is filled. This cock is then closed, and the door I, leading into the interior of the casing, being opened, the gas is admitted. The Bunsen burners *b* by the coil *a* are ignited. The flames, rising between the outer and inner perforated jackets, surround the tubes C′ C′ and heat the water contained in them with great speed. As its temperature increases the water rises in these tubes and overflows into the chamber E, and as the steam is generated it drives the excess of water in this chamber up through the pipe F′ into the condensing-drum F, the lower end of the pipe being in a plane somewhat below the upper ends of the tubes C′. In this manner the water-line is always kept at a point just below the upper ends of the tubes C′, thereby forming a trap to prevent backward flow of water from the overflow-chamber E through the tubes C′. The moment the water rises in the tubes C′ and overflows into the chamber E circulation begins in the radiating-pipes A′, Fig. 6, which pass from the heater through the space to be warmed and back to the apparatus. The fluid, as it rises in temperature, flows outward through the pipe *e* into the radiating-pipes, and water at the same time is drawn into the chamber C through the pipe *e*′, connected with the return end of the radiating-pipes. This sets up a circulation throughout the whole length of the radiating-pipes, the water in the tubes C′ overflowing into the chamber E, passing down and out at its lower end through the pipe *e* into the lines of radiating-pipe A′, (seen in Fig. 6,) and back through the pipe *e*′ into the water-chamber C. When the temperature rises to 210° or 212° Fahrenheit and ebullition begins, the current pours through these pipes with great velocity, passing back into the heater so rapidly that no difficulty is experienced in keeping the temperature of the radiating-pipes at a high point throughout their entire length.

From the nature of this operation I term the central chamber, E, the "overflow-chamber," since it receives the water poured into its upper end by the tubes C′. The circulation in these tubes must be invariably in one direction—viz., upward. The draft is so directed that the flames are driven toward and around the series of tubes C′ and away from the central or overflow chamber, concentrating the heat upon the tubes, while at the same time the draft-currents are sufficient to prevent ebullition in chamber E. Undue pressure and consequent danger of explosion is thus avoided.

As steam is generated, it is condensed in the drum F; but should there be any portion not condensed it will operate in the following manner: As the vapor passes upward through the pipe F′, it will condense in the drum until the temperature of the water is raised to the point of vaporization. It will be easily seen therefore that the moment sufficient vapor is generated to fill the steam-chamber D above the chamber E, it will act to drive the excess of water up into the condensing-drum, and the whole weight of the column of water in the pipe F″ will be sustained and be balanced by the pressure of the vapor in the steam-chamber D upon the surface of the water in the chamber E. As fast as this water is evaporated the loss will be supplied by water from the condenser F flowing downward into the chamber C, whence it will pass again through the tubes C′ into the chamber E and pass out through the radiating-pipes, and thence back into the heater. It is evident therefore that the condensing-drum F serves to check the excessive generation of steam, by which danger of explosion might be incurred. Being situated, as it is, at a distance from the heater, it will slowly radiate any excess of temperature, and will thereby cause a constant condensation of the steam which is driven from the chamber E up the pipe F′. Moreover, it will operate as a safety-reservoir to prevent the water in the heater from falling too low, or, in fact, sinking at all, since as long as any water remains in the drum it will flow into the water-chamber C through pipe F″, and the level of the water in the overflow-chamber will be maintained at the point where the pipe F′ opens into said chamber. The pipe F″ may, however, be connected to and run into the chamber E instead of the chamber C, and this form of arrangement is preferable, since the cooler water from the drum is then mingled at once with the hot water in the chamber E and passes at once into the pipes without checking the circulation.

If desired, I may employ the steam generated in the apparatus as a heating agent in connection with the water-pipes. Fig. 6 represents in horizontal elevation a heater so organized; but in it the pipe F′, leading from the overflow-chamber, instead of rising directly to the condensing-drum, is carried downward and passes around the surface to be heated, where it may be laid side by side with the radiating-pipes, or otherwise located, as desired. Thence it returns to the drum, to which it is connected in the same manner as the pipe F′ shown in Fig. 2 and already described.

In Fig. 6, $F^3$ represents the steam-pipe, which passes from the dome of the heater downward and around the flooring of the car, as shown at A″, where it is shown lying beside the water-pipe A′. After leaving the floor the return-pipe (designated by $F^4$) ascends to the drum.

The pipe $F^4$ seen in Fig. 1 is shown in Fig. 6 as $F^5$, so as to retain all the benefits derived from the drum F as a condenser, and at the same time utilize a large percentage of heat which would be radiated from the condensing-drum.

I have provided the pipe F′ with a check-valve, *g*, to prevent the flow of water in it back into the chamber E, and the pipe F″ with a valve, *g′*, to prevent the rising of water through it into the drum.

The heater described in the foregoing pages is more particularly intended for the consumption of gas as an agent of combustion.

In Figs. 4 and 5 of the drawings I have shown an apparatus in which hard coal may be burned. The substitution of coal for gas or oil necessarily involves important modifications in construction. $A^2$ is the grate, immediately above which is the combustion-chamber or fire-pot $B^2$, surrounded by a water-chamber, C, corresponding with the chamber C in Fig. 2. The tubes C′ rise from this lower water-chamber, C; but, instead of overflowing toward the center, as in Fig. 2, they empty into an annular water-chamber, E, outside. The eduction-pipe, through which the outward flow takes place, connects with this outer chamber at $E^2$, and the return-pipe is seen entering the water-chamber C at $G^2$. A condensing-drum of the same form and arrangement already described will be used in this form of heater, and the fuel will be introduced at the top through a sliding door, *d*. A sectional trap, *l*, one half of which slides horizontally upon the other portion, (the two being connected by pins running in slots, as partly shown in Fig. 5 at *m*,) closes the opening at the top of the reservoir L, through which coal is introduced. After the fire-pot is filled a further quantity is poured into the cylindrical reservoir L, filling it full. This coal rests upon that in the fire-pot, and is consumed in the same manner as in the well-known base-burning coal-stove. It should be distinctly understood that in this form of heater the same condensing-drum and the same general arrangement of pipes are required as in that shown in Figs. 1 and 2. I have therefore not shown in Figs. 4 and 5 those parts which are merely duplications of the condenser and its pipes. At the same time I employ the condensing-drum to guard against danger by preserving the water constantly at the same level in the chamber E, as already described.

In arranging this apparatus on a horse-car according to my invention I propose to locate the heater at one end beneath the seat, as shown in Fig. 6. It may, however, be found preferable to place it in the center of the car, as being subjected to less motion, and consequently greatly diminishing the "swash" of the water in the interior of the chamber E. If placed at the end, however, the chamber E may be covered by a diaphragm having a central depression and opening, which will allow the free circulation of fluid, and at the same time prevent the violent agitation of the surface. Its extremely small size, and the fact that its organization renders all danger from heat, smoke, or scorching impossible, enable me to employ the space beneath the seat for this purpose, and thus avoid the necessity of sacrificing space needed for other purposes. From the heater the pipes run to the flooring, and thence outward and down the entire length of the car, passing up both sides, and finally returning to the heater. I have shown them as sunk below the plane of the floor and covered by a grating, through which the heat may radiate upward. Any other construction by which the same results may be gained may be substituted—as, for example, instead of a grating, a shallow metal jacket may be sunk in the flooring and the pipes laid in it. Being thus wholly inclosed, in some cases this may prove a desirable change, as the loss of heat by radiation will not be quite as rapid as when a grating is employed.

The flue G′ for the smoke and other products of combustion passes beneath the seat of the car to the end, and may be either carried up to the roof or turned downward and discharged beneath the car. Access is obtained to the heater by panels, (shown in broken lines in Fig. 6.) One may open at the end and upon the outside of the car, and one in front of the seat and inside of the car. If desired, it would be easy, in place of one of these, to hinge a section of the seat directly above the heater, and thus obtain access from above.

As I have already remarked, my apparatus is so contrived that it may be made of less dimensions than any other heater of which I have knowledge, while at the same time it is so powerful that it will develop and maintain the full degree of heat required throughout the entire length of the radiating-pipes, even in the coldest weather. These pipes may be so laid as to cover a space in the flooring of four, six, or even eight inches in width, running directly in front of the seats occupied by passengers. The diameter of the pipes will, in a measure, determine the number of coils. It may be found advantageous, also, to employ a pipe specially constructed for this form of heater, and having a flattened or oval shape, in order to increase the extent of the upper radiating-surface.

I am aware of United States Letters Patent No. 210,563, granted to me December 3, 1878; also, No. 218,685, granted to W. E. Prall, August 19, 1879, and make no claim in this application to anything shown in said Letters Patent.

Having thus fully described my invention, what I claim, and desire to secure by Letters Patent of the United States, is—

1. A water-heater for railway-cars having combined therein the following elements, to wit: a combustion or fire chamber, water-chamber C, surrounding the said fire-chamber, an overflow-chamber, tubes connecting these two chambers and adapted to conduct the water from the annular chamber to the overflow-chamber E, and radiating-pipes passing from the overflow-chamber through the space to be heated, thence returning to the said water-chamber, substantially as and for the purposes set forth.

2. The combination, with the annular water-chamber and overflow-chamber, of a series of tubes connecting them and an outer and inner jacket inclosing the tubes between them, substantially as and for the purpose set forth.

3. The combination, with an overflow-chamber, E, and a separate water-chamber, of a series of tubes connecting the two chambers, and heating apparatus adapted to act upon or apply heat to the said tubes for the purpose of causing circulation from the water-chamber through the tubes to the overflow-chamber E, substantially as and for the purpose set forth.

4. In a heater, the water-chamber C, into which the water to be heated is fed, an overflow-chamber, the series of water-conducting and heating tubes connecting the said chambers, a condensing-drum, and pipes F′ F″, the former entering the overflow-chamber and opening into the same at a point below the upper end of the said conducting and heating tubes, substantially as and for the purposes described.

5. The combination, with the fire-chamber, of an annular water-chamber surrounding the same, tubes rising from said chamber to an overflow-chamber into which said tubes discharge, radiating-pipes leading from said overflow-chamber through the space to be heated and back to the annular chamber, a condensing-drum having a pipe-opening into the overflow-chamber below the upper ends of the tubes C′, its other end extending into the condenser, and a second pipe leading from the bottom of the condenser to the annular water-chamber, substantially as and for the purpose set forth.

6. The combination, with a gas-burner, of the annular chamber C, the overflow-chamber E, the tubes C′, and the pipes *e e′*, substantially as and for the purpose set forth.

7. The combination, with the jacket H, of the inner and shorter jacket, H″, both being perforated throughout their lower part, a series of water-tubes arranged between said jackets, and apparatus for heating the water, substantially as and for the purpose set forth.

8. The combination, with the jackets H and H″, of a series of water-conducting tubes, C′, arranged between said jackets and the outer jacket, H′, substantially as and for the purpose set forth.

9. The combination, with the heater, having two water-chambers arranged as described, of a condensing-drum, the steam-pipe passing from the heater directly through the space to be heated and thence back to the condenser, the pipe F″, and valves to permit the circulation of water in but one direction in the said pipes, substantially as and for the purpose set forth.

10. The combination, with the flooring of a street-railway car, of the heater consisting of the water-chambers C E, tubes C′, a suitable heating apparatus, condenser F, and pipes F′ F″, and the pipes *e e′*, substantially as and for the purpose set forth.

In testimony whereof I affix my signature in presence of two witnesses.

IRA A. SALMON.

Witnesses:
T. WALTER FOWLER,
H. B. APPLEWHAITE.